June 7, 1966 P. OHRINGER 3,254,530
SURFACE ROUGHNESS TRACER HEAD
Filed Nov. 20, 1962
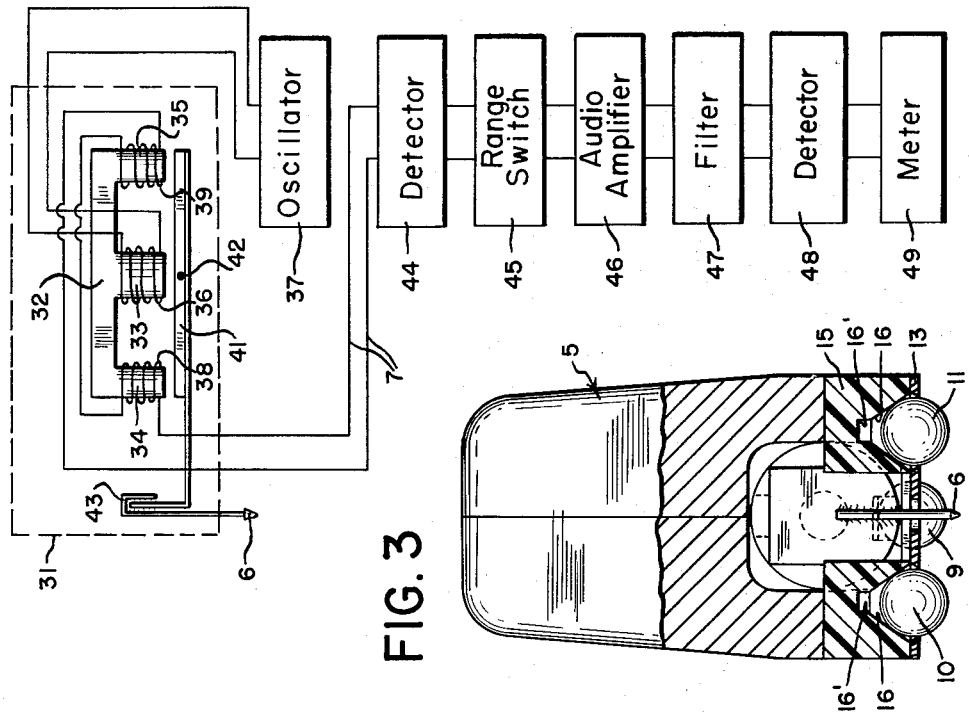
INVENTOR
Philip Ohringer
BY
ATTORNEYS

United States Patent Office 3,254,530
Patented June 7, 1966

3,254,530
SURFACE ROUGHNESS TRACER HEAD
Philip Ohringer, Commack, N.Y., assignor to American Gage & Machine Company, Chicago, Ill., a corporation of Illinois
Filed Nov. 20, 1962, Ser. No. 238,905
8 Claims. (Cl. 73—105)

This invention relates to a surface roughness tracer head adapted for application to and movement upon a surface whose roughness is to be measured.

Surface roughness measuring devices are known which utilize a tracer head containing a stylus and a transducer, the transducer being coupled to the stylus to convert movement thereof into an electrical signal. The tracer head is moved over a surface with the stylus in contact therewith so that minute irregularities in the surface generate an electrical signal. The electrical signal is then used to obtain an indication of surface roughness. In some instruments the tracer head is moved manually over the surface, and in others it is machine-driven.

Commonly, in tracer heads designed for manual operation, rounded skids are provided on the under side which contact the surface to be measured and established a reference plane for movement of the stylus. Such skids are likely to wear during use, and thereafter may mar the surface. Also, depending on the pressure employed by the operator, the work surface may be somewhat burnished.

In addition, movement of the tracer head over the surface produces a certain amount of microphonic noise in the transducer output which varies with the pressure applied to the head and also with the velocity of movement, hence making it difficult to obtain reproducible indications. This becomes particularly serious when finely finished surfaces having only a small degree of roughness are being measured. It is believed that this is due, at least in part, to slight vibrations of the tracer head housing as it is moved across the surface which are communicated to the fixed part of the transducer mounted therein and produce microphonic noise in the output signal. Such vibrations are believed to arise primarily out of frictional effects, although other factors may also be involved. Since transducers commonly respond to relative movement between a part fixed to the housing and a movable part coupled to the stylus, the output signal will contain components due to both sources of vibrations. The vibrations of the housing will generally be quite different from those of the stylus and their amplitudes, although small, may be appreciable compared to those of the stylus. Inasmuch as the vibrations of the housing will change with pressure and speed of movement, the effect thereof varies and makes it difficult or impossible to obtain reproducible readings, particularly on finely finished surfaces.

The motor-driven devices tend to reduce the adverse effects of such vibrations since more uniform pressures and velocities can be obtained. Thus, even though extraneous noise is created by movement of the head over the surface, it tends to remain more constant and promotes reproducibility of readings. However, motor drives tend to introduce noise due to shock when they reverse at each end of their travel. They are also subject to restrictions and inconveniences which limit their usefulness in practice. In general a particular setup with respect to the surface to be examined is required. An appropriate setup may be difficult to obtain, and in any event may be time-consuming. Work surfaces having different shapes and radii of curvature require the drive to be adapted for the particular surface to be measured. Many of the drives are so constructed that measurements can be made only on flat surfaces or those of the particular shape for which the drive is designed.

The present invention provides a small, lightweight tracer head capable of manual operation upon a work surface without introducing a large and variable amount of extraneous noise in the signal output, so that satisfactorily reproducible measurements of surface roughness can be obtained. The tracer head of the invention is capable of measuring the surface roughness of pheres and single and double curved surfaces, as well as flat surfaces.

In accordance with the invention, rotatable balls are employed to rollably support the tracer head upon a surface to be measured. Advantageously, three balls are employed, with two balls mounted on respective sides of the stylus near the front end of the head and a third ball mounted near the rear end of the head. A resilient damping seat is provided for each of the balls, the seats being formed in resilient damping material having a low coefficient of friction, such as Teflon (polytetrafluoroethylene). Preferably the seats have conical surfaces in the region thereof engaged by the balls, and an apertured retaining plate retains each ball in its corresponding seat but is spaced from the housing so as to be out of contact with the ball during normal use.

The use of rolling balls avoids frictional effects with the surface being measured, and the low coefficient of friction between the balls and the resilient damping material reduces the noise due to frictional effects at these points. The seats also serve to substantially damp out residual noise and prevent it from reaching the housing and hence the transducer. It has been found that the tracer head of the invention can be manually operated with satisfactorily repeatable results even on finely finished surfaces.

Further features and advantages of the invention will appear as the description proceeds. The invention will best be understood from the following description of a specific embodiment, when read in connection with the accompanying drawings, in which:

FIG. 1 is a side elevation of one embodiment of the invention;

FIG. 2 is a view from the underside of FIG. 1;

FIG. 3 is a partially sectional view taken along line 3—3 of FIG. 1; and

FIG. 4 is an example of an electrical circuit that may be employed.

Referring to FIGS. 1–3 of the drawings, a tracer head is shown including a housing 5 in which a stylus 6 is mounted for engagement with a surface to be measured. As particularly shown, the stylus moves vertically in response to irregularities in the surface to be measured, and is flexibly mounted in any suitable manner for this purpose. A transducer of suitable type is mounted in the housing 5 and is coupled with the stylus 6 to convert movement thereof into an electrical signal. FIG. 4, described hereinafter, shows one form of transducer and stylus arrangement which may be employed. Cable 7 is affixed to housing 5 by clamp 8 and is connected to the transducer for supplying the signal to a separate indicating device.

When in position on the surface to be measured, housing 5 is rollably supported thereon by three rotatable balls 9, 10 and 11. The balls may be of any suitable material having a finely finished surface. Sapphire balls have been found to be particularly suitable since they have little affinity for metals and hence do not tend to have their surfaces contaminated. Tungsten carbide balls have been found satisfactory for many applications, but have a greater affinity for some metals.

The balls are arranged in an isosceles triangle configuration, with balls 10 and 11 located on opposite sides of stylus 6 and ball 9 to the rear thereof. This provides a three-point support which establishes a stable reference plane regardless of surface contour. By mounting balls 10 and 11 at the front corners of the head, and ball 9 near the rear edge, the head can be employed on convex or concave surfaces of either single or double curvature.

Resilient damping seats are provided for the balls, formed in a resilient damping material having a low coefficient of friction. Teflon has been found very satisfactory for the purpose, although other materials having adequate resilience and damping properties, and a low coefficient of friction, could be employed if desired.

As shown, a resilient damping seat for each of the balls is formed in a Teflon block. A single block of Teflon could be employed, with the several seats formed therein, or a separate block could be used for each seat. However, for ease of manufacture without requiring an excessive amount of Teflon, in FIGS. 1–3 the seats for balls 10 and 11 are formed in one block 15 and the seat for ball 9 formed in a separate block 14. The seats are preferably formed so that the portions thereof contacting the balls are conical surfaces, so that lateral movement of the balls in their seats is avoided. Thus, seat 16 for ball 10 is conical. The tip 16' thereof is not contacted by the ball and may be of any convenient shape, for ease of manufatcure. The Teflon block 15 is drilled or cut away to allow for the unimpeded passage of the stylus 6 and its supporting member therethrough.

An apertured retaining plate is employed to retain each ball in its corresponding seat. Here, also, a single plate with several aperutres could be employed, or a separate plate for each ball. As shown, one retaining plate 13 is employed for balls 10 and 11, and a separate plate 12 for ball 9. This facilitates manufacture while still allowing satisfactory adjustment of the clearance with each ball, described below. The aperture are slightly smaller than the diameter of the balls. The retaining plates bear against the underside of the respective Teflon blocks, and the plates and blocks are attached to the housing 5 by screws. Thus plate 13 and block 15 are held in place by screws 22, 23, and plate 12 and block 14 by screws 20, 21. By tightening or loosening screws 22, 23, the spacing of plate 13 may be adjusted, the resiliency of the Teflon block 15 serving to retain the adjustment once made.

During use, it is desired to have the bearings make no contact other than with their resilient seats and the surface to be measured. Thus, plate 13 is adjusted so that, during normal use, there is a slight clearance between the balls 10 and 11 and the plate. To this end the angle of the conical seats and the diameter of the balls can be made such that, with suitable selection of the diameters of the apertures and adjustment of the spacing of the plate from the housing, there is a slight clearance between balls and plate when the tracer head is held upside down. Or, under this condition there could be slight contact of the plate with the balls and reliance placed upon normal pressure during use to slightly compress the resilent seats and provide the desired clearance between the balls and the plate. Plate 12 is similarly adjusted.

The thickness of block 15 should be sufficient to damp out any vibrations resulting from the rolling of the tracer head over the surface to be measured, and prevent these vibrations from reaching the transducer mounted in the housing and producing microphonic noise in the output signal. A thickness approximately equal to the radius of the balls has been found satisfactory.

In one specific embodiment as shown in FIGS. 1–3, the dimensions of the tracer head are $1\tfrac{9}{16}''$ long, $1\tfrac{1}{8}''$ high and $1\tfrac{3}{16}''$ in width. The thickness of the front Teflon seat member 15 is $\tfrac{1}{4}''$ and that of the rear seat member 14 is $\tfrac{1}{8}''$. The balls are $\tfrac{3}{16}''$ in diameter. This head is capable of use on single or double curved surfaces having a minimum radius of two inches. These dimensions are given for illustrative example only, and may be widely departed from in practice as meets the requirements of the intended applications.

Referring now to FIG. 4, the elements shown within the dotted box 31 are contained within housing 5 of the tracer head. Here the transducer is shown as an E-core 32 of magnetic material having a center leg 33 and end legs 34 and 35. Primary coil 36 is wound around the center leg and is supplied with alternating current from oscillator 37. Secondary coils 38 and 39 are wound around the end legs, and connected in opposition. An armature 41 is pivoted at 42 and is coupled to stylus 6 through a viscous coupling device 43. Movement of stylus 6 moves the armature 41 toward one leg and away from the other leg, and vice versa, thus generating a signal in the output line 7. Devices of this kind are known in the art and further description is unnecessary.

The output of the transducer, in line 7, is an amplitude modulated carrier, where the carrier frequency is that of oscillator 37, and is supplied to detector 44 for demodulation. A range switch 45 serves to change the sensitivity of the instrument and may conveniently be a voltage divider with selectable taps thereon. The resultant signal is passed through an audio amplifier 46 to a filter 47. Advantageously the filter is of the adjustable high pass type so that different cutoff frequencies may be selected to correspond to different roughness width cutoffs. The output of the filter is supplied to a detector 48 to obtain a varying D.-C. signal which is supplied to meter 49 for indication. Surface roughness measuring instruments of this type are known in the art and detailed description is unnecessary.

In operation, the tracer head is placed on a surface and moved thereacross. Stylus 6 follows any irregularities in the surface and the transducer in the head produces a corresponding electrical signal. The balls 9–11 establish a stable reference plane for movement of the stylus. Inasmuch as the balls are resiliently mounted and roll over the surface, the surface is undamaged. The use of smooth rolling balls and resilient damping seats of material having a low coefficient of friction reduces frictional vibrations to a low magnitude. Any residual frictional vibrations, and any vibrations due to the rolling of the balls on the surface, are prevented from reaching the fixed part 32 of the transducer mounted in the tracer head, so that little if any noise results therefrom. Accordingly, the output of the transducer in line 7 is almost exclusively due to movement of the stylus 6.

With balls which roll during normal operation and seats having a low coefficient of friction, the dual advantage is obtained of continuously providing new wear surfaces to avoid the formation of flats, and at the same time reducing the frictional noise which is to be damped out. For some applications it may suffice to provide resilient damping seats for the balls which do not allow the balls to roll during use, as by suitably shaped seats and material having a sufficiently high coefficient of friction such as rubber, but allow manual rotation to present new wear surfaces as required. In such case the resilient damping seats will reduce the amount of frictional noise reaching the transducer due to sliding of the balls on the surface being measured.

I claim:
1. A surface roughness tracer head which comprises
(a) a housing,
(b) a stylus mounted in the housing for engagement with a surface to be measured,
(c) transducer means mounted in the housing and coupled with the stylus for converting movement thereof into an electrical signal,
(d) a plurality of spaced rotatable balls for rollably supporting the housing upon a surface to be measured,

(e) a resilient damping seat for each of said balls formed in a block of resilient damping material having a low coefficient of friction,
(f) each of said seats having a substantially conical surface in the region thereof engaged by a ball, and
(g) an apertured retaining plate for retaining each ball in the corresponding seat and spaced from the housing to be out of contact with the ball during normal use.

2. A surface roughness tracer head in accordance with claim 1 in which said rotatable balls are of smooth hard material.

3. A surface roughness tracer head which comprises
(a) a housing,
(b) a stylus mounted in said housing and protruding downwardly therefrom near the front end thereof for engagement with a surface to be measured,
(c) transducer means mounted in the housing and coupled with the stylus for converting movement thereof into an electrical signal,
(d) a pair of rotatable balls mounted on respective sides of the stylus and a third rotatable ball mounted near the rear end of the casing for rollably supporting the housing upon a surface to be measured,
(e) a resilient damping seat for each of said balls formed in a block of resilient damping material having a low coefficient of friction,
(f) each of said seats having a substantially conical surface in the region thereof engaged by a ball, and
(g) an apertured retaining plate adjustably affixed to the housing on the underside of said resilient damping material for retaining each ball in the corresponding seat and spaced from the housing to be out of contact with the ball during normal use.

4. A surface roughness tracer head in accordance with claim 3 in which said resilient damping material is Teflon.

5. A surface roughness tracer head which comprises
(a) a housing,
(b) a stylus mounted in the housing and protruding downwardly therefrom near the front end thereof for engagement with a surface to be measured,
(c) transducer means mounted in the housing and coupled with the stylus for converting movement thereof into an electrical signal,
(d) a pair of rotatable balls mounted on respective sides of the stylus and a third rotatable ball mounted near the rear end of the casing for rollably supporting the housing upon a surface to be measured,
(e) a resilient damping seat for each of said balls formed in a block of resilient damping material having a low coefficient of friction and having a thickness at least as great as substantially the ball radius,
(f) each of said seats having a substantially conical surface in the region thereof engaged by the ball, and
(g) an apertured retaining plate affixed to the housing on the underside of said resilient damping material for retaining each ball in the corresponding seat and adjustable against the resilient damping material to establish a clearance between the retaining plate and the ball during normal use.

6. A surface roughness tracer head in accordance with claim 5 in which said resilient damping material is Teflon.

7. A surface roughness tracer head in accordance with claim 6 in which said rotatable balls are of smooth hard material.

8. A surface roughness tracer head which comprises
(a) a housing,
(b) a stylus mounted in the housing for engagement with a surface to be measured,
(c) transducer means mounted in the housing and coupled with the stylus for converting movement thereof into an electrical signal,
(d) a plurality of spaced rotatable balls for rollably supporting the housing upon a surface to be measured,
(e) a resilient damping seat for each of said balls formed in a block of resilient damping material having a low coefficient of friction, and
(f) an apertured retaining plate for retaining each ball in the corresponding seat and spaced from the housing to be out of contact with the ball during normal use.

References Cited by the Examiner

UNITED STATES PATENTS

| 2,330,801 | 10/1943 | Abbott | 73—105 |
| 2,363,691 | 11/1944 | Reason | 73—105 |
| 2,724,783 | 11/1955 | Renaut | 310—8.7 |
| 2,819,486 | 1/1958 | Dick | 16—24 |
| 3,011,219 | 12/1961 | Williams | 308 |

FOREIGN PATENTS

| 565,564 | 11/1958 | Canada. |
| 630,848 | 10/1949 | Great Britain. |

DAVID SCHONBERG, *Acting Primary Examiner.*

RICHARD QUEISSER, *Examiner.*